(12) United States Patent
Iwata

(10) Patent No.: US 7,379,700 B2
(45) Date of Patent: May 27, 2008

(54) IMAGE READING APPARATUS WITH ROTATABLE INTERNAL AND EXTERNAL GUIDES

(75) Inventor: Hyoe Iwata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 10/834,060

(22) Filed: Apr. 29, 2004

(65) Prior Publication Data

US 2004/0223796 A1 Nov. 11, 2004

(30) Foreign Application Priority Data

May 6, 2003 (JP) .............................. 2003-127791

(51) Int. Cl.
*G03G 15/00* (2006.01)
*G03G 21/16* (2006.01)

(52) U.S. Cl. ...................... 399/367; 399/124; 399/374; 399/365; 399/125; 355/407; 358/408

(58) Field of Classification Search ................ 399/367, 399/374, 124, 125, 365; 355/407; 358/408
See application file for complete search history.

(56) References Cited

U.S. PATENT DOCUMENTS

| | | | | |
|---|---|---|---|---|
| 4,754,337 A | * | 6/1988 | Nohtomi et al. ............ | 358/401 |
| 5,285,245 A | * | 2/1994 | Goto et al. .................. | 399/322 |
| 5,345,295 A | * | 9/1994 | Takano et al. .............. | 399/125 |
| 5,878,319 A | * | 3/1999 | Itoh ............................ | 399/367 |
| 5,986,775 A | * | 11/1999 | Yoshimizu .................. | 358/496 |
| 6,038,424 A | * | 3/2000 | Nakagawa .................. | 399/367 |
| 6,172,774 B1 | * | 1/2001 | Yamashita .................. | 358/474 |
| 6,585,258 B1 | * | 7/2003 | Hirota et al. ............... | 271/186 |
| 7,202,983 B2 | * | 4/2007 | Yokota et al. .............. | 358/496 |

FOREIGN PATENT DOCUMENTS

| | | |
|---|---|---|
| JP | 11-69086 | 3/1999 |
| JP | 2928449 | 5/1999 |
| JP | 11-327221 | 11/1999 |

* cited by examiner

*Primary Examiner*—Ren Yan
*Assistant Examiner*—Matthew Marini
(74) *Attorney, Agent, or Firm*—Fitzpatrick, Cella, Harper & Scinto

(57) ABSTRACT

A document reading apparatus includes a feeding roller for feeding a document, a reading unit for reading images of the document fed by the feeding roller and a substantially U-shaped document transfer path for guiding the document fed the feeding roller. The substantially U-shaped document transfer path is constituted by an internal guide and an external guide. The external guide is separated from the internal guide by rotating the external guide. The internal guide is rotatably disposed and supports the reading means. A reading transfer path in which the reading unit is arranged is opened by rotating the internal guide.

5 Claims, 7 Drawing Sheets

IMAGE READING APPARATUS WITH ROTATABLE INTERNAL AND EXTERNAL GUIDES

BACKGROUND OF THE INVENTION

1. Field of the Invention

The present invention relates to an image reading apparatus.

2. Description of the Related Art

As a unit for reading image information on each side of documents piled on a document tray during conveying process, a so-called ADF (Auto Document Feeder) has been known for a long time.

The ADF is classified by the presence of a document reversing unit and a reading out unit as follows.

(1) Single-sided document ADF (FIG. 5):

Documents piled on a document tray 1001 are separated one by one, and conveyed onto a platen 1002, so as to read out images in an image reading unit 1003, and then, are discharged.

(2) Double-sided document ADF with a turning-over unit (FIG. 6):

After the first side is read out by the image reading section 1003, the document is turned over by a turning-over unit 1005 so as to convey the turned-over document on the platen 1002 again so as to read out the rear side as the second side.

(3) Double-sided document ADF with reading units (FIG. 7):

In an ADF device, a first reading unit 1006 and a second reading unit 1007 are arranged along a document transfer path so as to simultaneously read both sides during conveying the document.

Among above three ADFs, although (1) is most inexpensive, it cannot read out double-sided documents automatically so as to have a fault of low productivity.

In the double-sided document ADF with the turning over unit of (2), since after separating one document from the documents on the document tray so as to convey it to a predetermined reading position for reading out one side, it is turned over and conveyed to the predetermined reading position again for reading out the other side and being discharged thereafter. Because of this double-sided reading procedure, there is a problem of low reading efficiency.

Also, since the transfer path becomes complicated, a problem may arise in that a document may be damaged during transferring.

Then, as for the double-sided document ADF with the reading units (3), since both sides are simultaneously read during the conveying of the document using two optical systems, although it is expensive, this is very excellent in productivity in comparison with other ADFs.

When the three ADFs are compared, the double-sided document ADF with the reading units of (3) is most excellent in productivity, so that this type of ADF may make progress quickly from now on.

In common double-sided document reading ADFs, as disclosed in Japanese Patent Publication No. 2928449, a first reading unit for reading one side and a second reading unit for reading the other side are arranged above and below with a document conveying path therebetween so that a document is read out through openings of guide plates.

However, this type of ADF with the reading units employs a so-called reduction optical system for the other side reading unit, which includes a light source, a plurality of turnover mirrors, a lens, and a CCD, so that the reading unit itself is large in size.

Therefore, the transfer path is substantially straight from paper feeding to discharge, so that the discharge tray is forced to protrude outside the ADF.

Then, Japanese Patent Laid-Open No. 11-69086 and Japanese Patent Laid-Open No. 11-327221 propose techniques for solving such problems.

The double-sided document reading apparatus described in the publication reduces the entire apparatus in size using a contact-type sensor instead of a reduction optical system so as to form a U-turn path.

In order to treat paper jamming not only for the ADF but for a paper conveying device, it is desirable to have an open/close mechanism for a transfer path.

Since the U-turn path becomes complicated more than a straight path, the open/close mechanism is especially indispensable.

Also, when dust exists in a document reading portion of the other-side reading unit, image defects such as black streaks and white streaks may be produced. Therefore, the maintenance for the document reading portion of the other-side reading unit must be easily performed, so that a mechanism for opening the document reading portion is indispensable.

In the double-sided reading apparatus disclosed in Japanese Patent Laid-Open No. 11-69086 or No. 11-327221, the contact-type sensor for reading the other side is arranged inside a transfer guide of the U-turn path.

Also, the double-sided reading apparatus disclosed in Japanese Patent Laid-Open No. 11-327221 has a two-stepped open/close hinge located at the end of the apparatus so as to achieve to treat the jamming inside the U-turn path; however its structure is very complicated and the mechanism itself is expensive.

Although the Japanese Patent Laid-Open No. 11-69086 does not specify an open/close mechanism of the transfer path in the vicinity of the contact-type sensor, the contact-type sensor is arranged in the lower portion of the feeding tray so as to have a considerably complicated arrangement. Therefore, when the open/close mechanism is to be adopted, the considerably complicated mechanism cannot be avoided.

SUMMARY OF THE INVENTION

The present invention has been made in view of the problems described above, and it is an object of the present invention to provide a reading apparatus excellent in jamming-treatment performance and maintenance by simplifying a transfer path of the reading apparatus and its open/close mechanism.

In order to achieve the above object, an image reading apparatus according to the present invention includes a feeding means for feeding a document; a reading means for reading images on the document fed by the feeding means; a substantially U-shaped document transfer path for guiding documents fed by the feeding means, which is constituted by an internal guide and an external guide; and a reading transfer path, in which the reading means is arranged, and which is a part of the document transfer path; wherein the external guide is rotatably disposed and is separated from the internal guide by rotating the external guide, wherein the internal guide is rotatably disposed and supports the reading means, and the reading transfer path is opened by rotating the internal guide.

Also, an image reading apparatus according to the present invention includes a feeding means for feeding documents; a first reading means for reading images on a first side of the document fed by the feeding means, the first reading unit being able to read images of the document placed on a platen; a second reading means for reading images on a second side of the document fed by the feeding means; a substantially U-shaped document transfer path for guiding documents fed by the feeding means, which is constituted by an internal guide and an external guide; and a reading transfer path, in which the second reading means is arranged, and which is a part of the document transfer path; wherein the external guide is rotatably disposed and is separated from the internal guide by rotating the external guide, wherein the internal guide is rotatably disposed and supports the second reading means, and the reading transfer path is opened by rotating the internal guide.

Further objects, features and advantages of the present invention will become apparent from the following description of the preferred embodiments with reference to the attached drawings.

DESCRIPTION OF THE PREFERRED EMBODIMENTS

The present invention will be described below by exemplifying embodiments with reference to the drawings.

Figure 1:
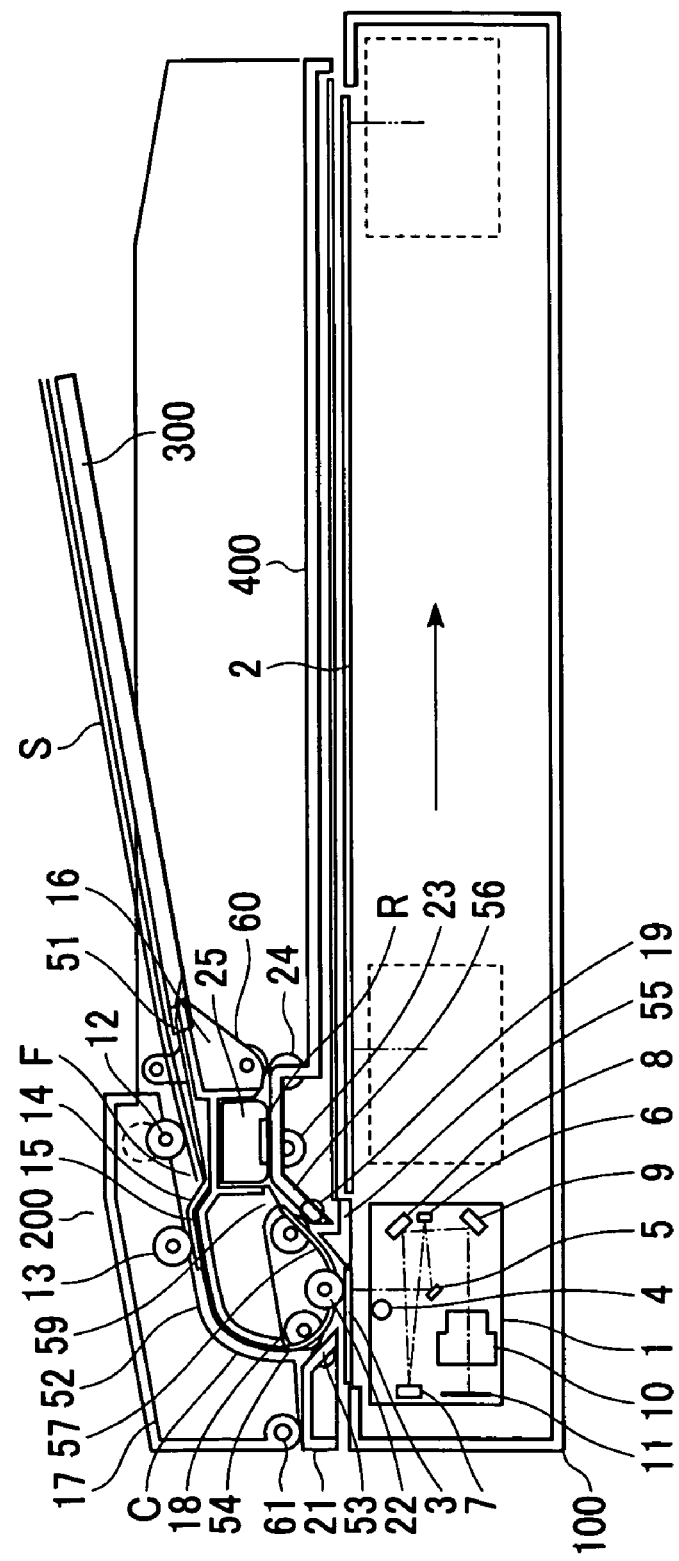
FIG. 1 is a sectional view of a double-sided document ADF according to an embodiment of the present invention.

FIG. 1 is an entire drawing of an ADF according to a first embodiment.

The ADF according to the embodiment includes a scanner section 100, a document reading/conveying section 200 mounted on the scanner section 100, a document tray 300 for supporting a document S to be fed to the document reading/conveying section by pressing a book document onto a platen glass plate, and a discharge tray 400 for supporting the document S from which images have been read.

Next, the scanner section 100 and the document reading/conveying section 200 will be described in more detail.

The scanner section 100 includes a first reading unit 1 disposed within a casing, a platen glass plate 2 for a book document disposed on the casing, and a platen glass plate 3 for a sheet document.

The first reading unit 1 provided in the scanner section 100 is fixed at the position shown in FIG. 1 when reading the document conveyed by the document reading/conveying section 200.

When a book document or a document incapable of using an ADF is read, by integrally rotating the document reading/conveying section 200, the document tray 300, and the discharge tray 400 about a hinge (not shown) so as to open the platen glass plate 2 for a book document, the document is placed and read by reciprocating the first reading unit 1 between broken-line positions shown in FIG. 1 corresponding to a document size by a drive unit (not shown).

The first reading unit 1 is composed of a lamp 4, a plurality of turnover mirrors 5, 6, 7, 8, and 9, a lens 10, and a photoelectric transducer 11 such as a CCD.

The document reading/conveying section 200 is composed of a feeding roller 12 as a feeding means, a separation transfer roller 13 for preventing the double feeding of the fed document, separation pads 14 and 15, a transfer guide unit 16, an upper transfer guide 17 serving also as an external cover, a transfer roller pair 18 and 19, a lower frame 21 having a transfer guide, a first platen roller 22 with a white surface, a second platen roller 23, a discharge roller pair 24, and a second reading unit 25 as a reading unit for reading the other side. The separation transfer roller 13 can abut the separation pad 15, and the separation transfer roller 13 and the separation pads 14 and 15 constitute a separation unit.

Although description is omitted, the image data read by the second reading unit 25 is controlled and processed in a series of reading and imaging operations by a control substrate (not shown).

Then, details will be further described by adding operations thereto.

From the documents placed on the document tray 300, the feeding roller 12 feeds the document on top of the document tray 300 in a state that its front bottom surface is supported by a transfer rib 51 (feeding guide) formed on the upper surface of a case 58 of the transfer guide unit 16 so as to be conveyed.

The feeding roller 12 is normally retracted upward at a position indicated a broken line in the drawing, which is a home position, so as not prevent a document from being set.

Upon starting of feeding operation, the feeding roller 12 is to descend to a position indicated by a solid line of the drawing so as to abut the top surface of the document S.

Even if several numbers of documents are simultaneously fed, they are separated into one sheet by the separation transfer roller 13 and the separation pads 14 and 15 made of a rubber material and is conveyed.

The separated document S is conveyed at a predetermined speed along the transfer rib 51 and a transfer rib 52 formed inside the external cover, and then is conveyed toward the platen glass plate 3 for a sheet document by the following transfer roller pair 18 and 19 after being conveyed toward a transfer surface 53 of the lower frame 21 and a guide plate 54.

The surface of the first platen roller 22 is white, and it is rotatable at a speed similar to a predetermined reading speed.

Then, the document S passes through between the platen glass plate 3 for a sheet document and the first platen roller 22 above the first reading unit 1 at the predetermined reading speed, so that the image information reading of a first side (the bottom surface in the drawing) is started.

Next, after the edge of the document S is drug up on a jump table 55, the document S is conveyed toward between a transfer surface 56 of the lower frame 21 and a guide plate 57, and then conveyed toward the second reading unit 25 by the transfer roller pair 19.

Figure 3:
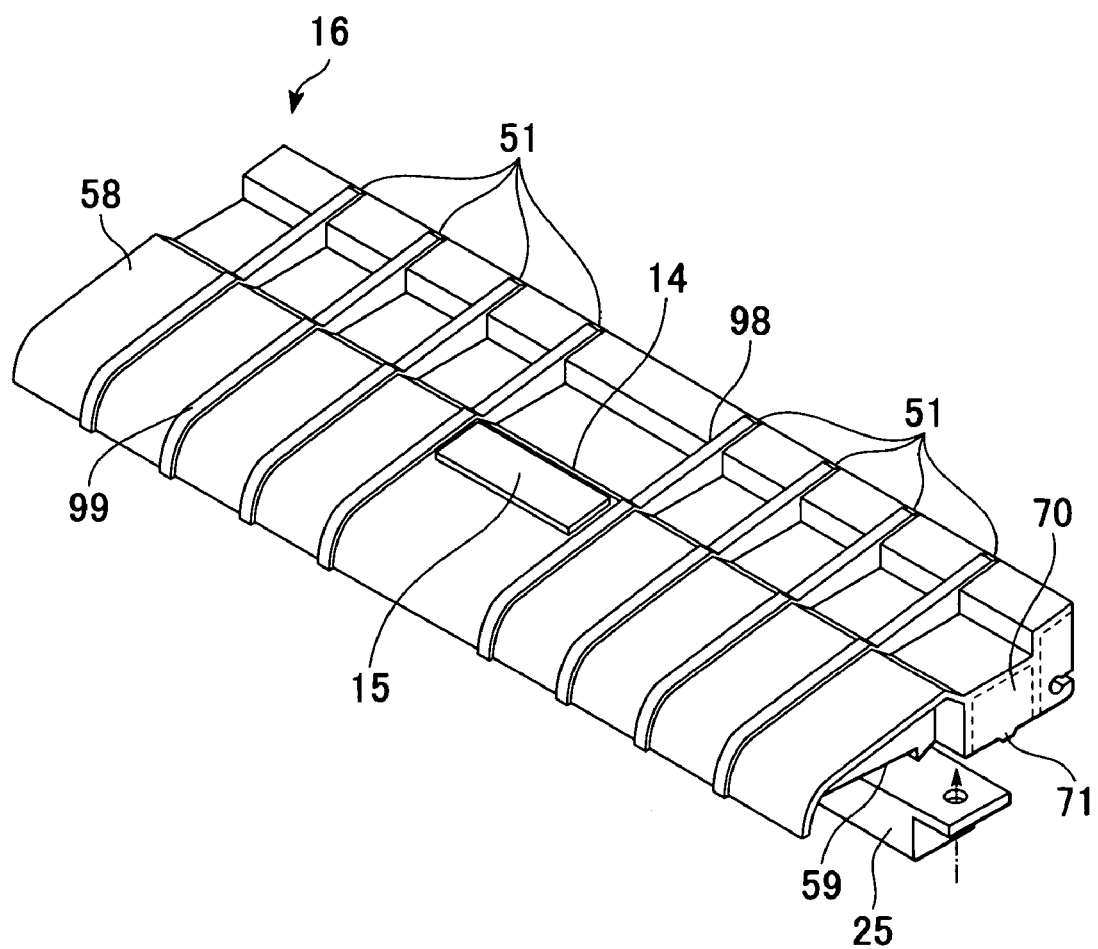
FIG. 3 is a perspective view of a transfer guide unit according to the embodiment of the present invention.

The transfer guide unit 16 includes the case 58, the separation pads 14 and 15 attached to the case 58, and the second reading unit 25. The second reading unit 25 is composed of a contact-type sensor, and as shown in FIG. 3, is fixed to a recess 70 of the case 58 integrally with the transfer guide unit 16 so that the reading surface of the second reading unit 25 directs downward by a predetermined fixing unit.

The case 58 is an integral molding, and includes an internal guide 99 forming the inside of a substantially U-shaped document transfer path and a feeding guide 98 for holding an edge of documents placed on the document tray 300. The feeding guide 98 is provided with the transfer rib 51 formed thereon.

Upstream a recess 71 of the case 58, a plurality of reading transfer ribs 59 (reading guides) are formed in the case 58 for guiding the document S to the second reading unit 25. The document S is conveyed to a reading position of the second reading unit 25 while being conveyed to the reading transfer ribs 59 and the transfer surface 56 of the lower frame 21 passing through the reading transfer ribs 59, a reading surface 25a of the second reading unit 25, the transfer surface 56 of the lower frame 21, and a reading/transfer path R.

The surface of the second platen roller 23 is white, and it is rotatable at a speed similar to a predetermined reading speed in the same way as in the first platen roller 22.

Figure 4:
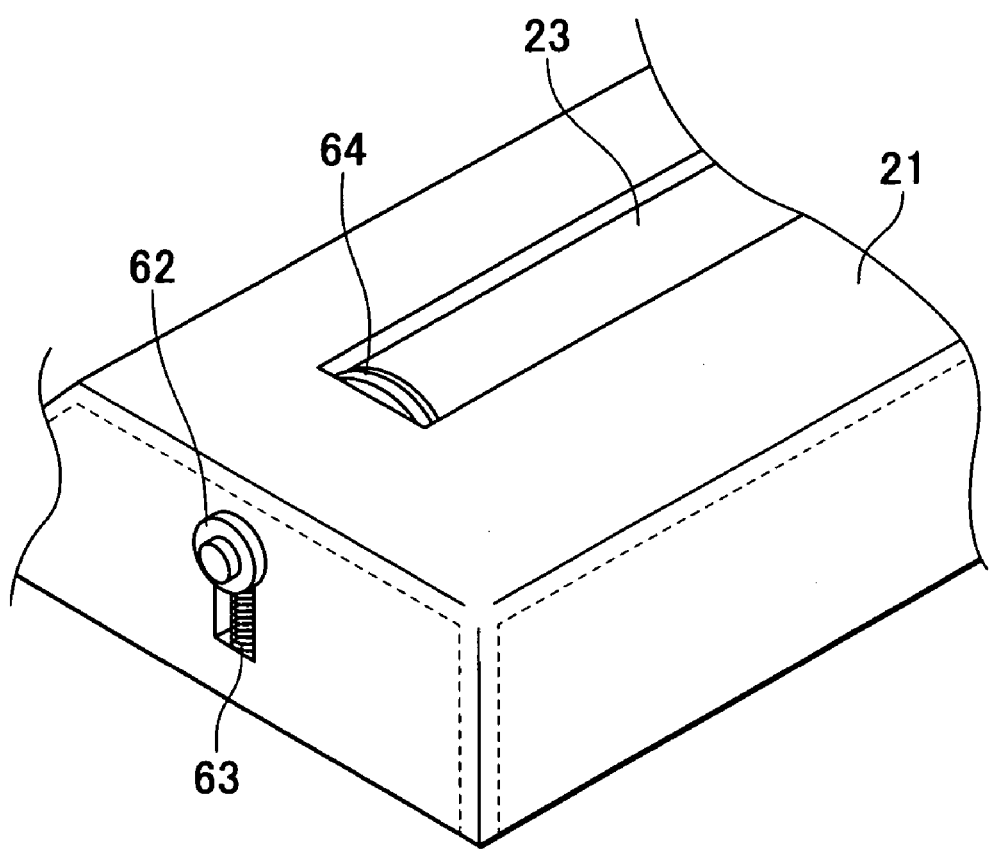
FIG. 4 is a perspective view of the vicinity of a second platen roller according to the embodiment of the present invention.
Figure 5:
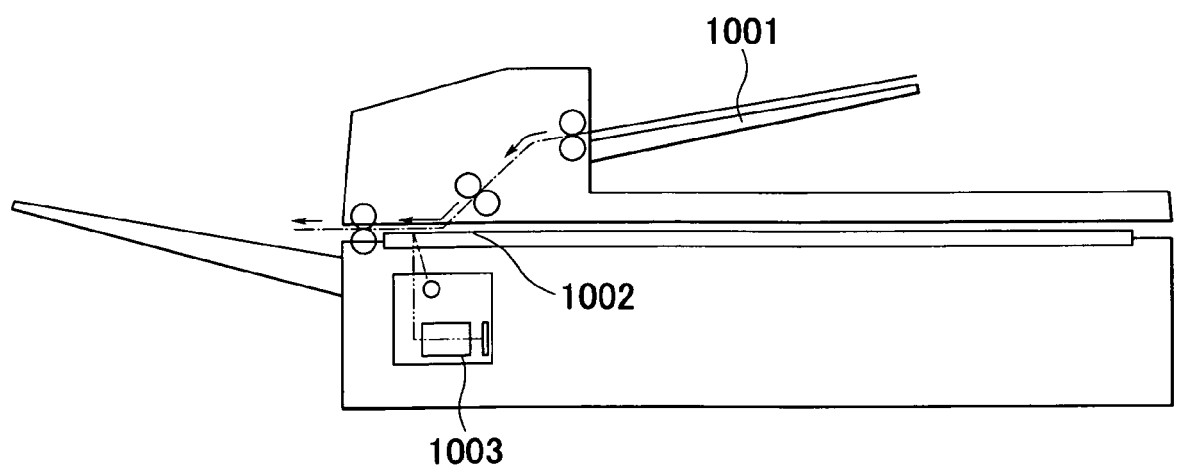
FIG. 5 is a sectional view of a conventional single-sided document ADF.
Figure 6:
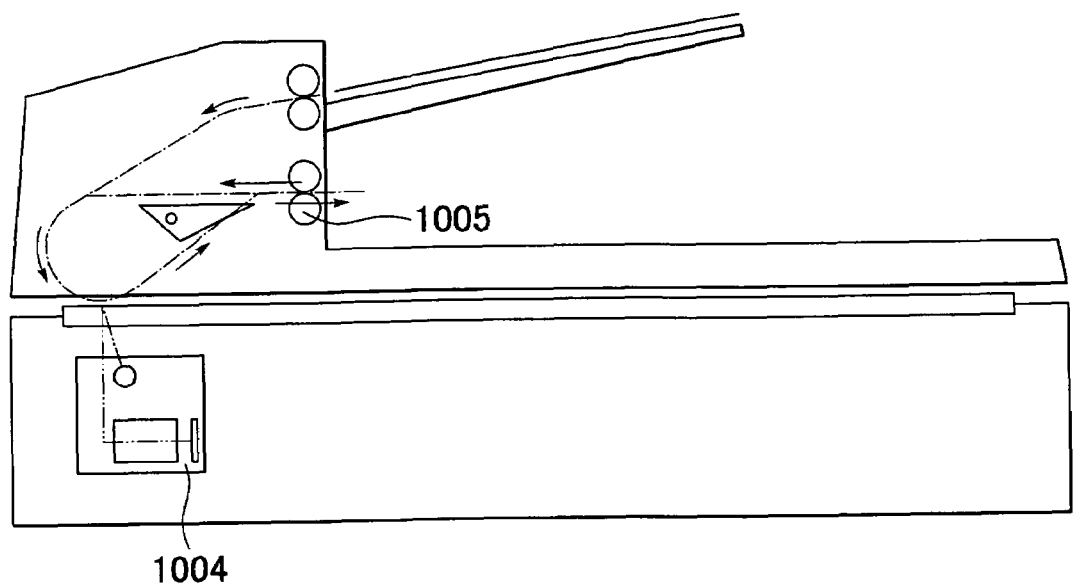
FIG. 6 is a sectional view of a conventional double-sided document ADF with a turnover unit.
Figure 7:
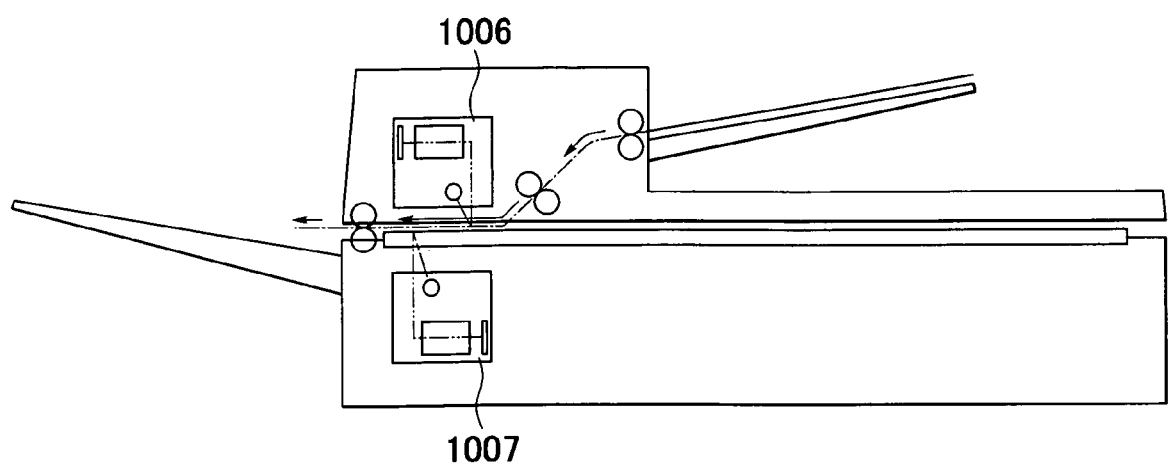
FIG. 7 is a sectional view of a conventional double-sided document ADF with a reading unit.

Bearings 62 (one shown only in the drawing) of the second platen roller 23 provided at both ends, as shown in FIG. 4, are upward urged by springs 63 (one shown only in the drawing), and the second platen roller 23 has rollers 64 (one shown only in the drawing) coaxially arranged at both ends of the roller section with a diameter slightly larger than that of the roller section.

By urging the rollers 64 on the surface of the second reading unit 25 with forces of the springs 63, the second reading unit 25 and the surface of the second platen roller 23 are arranged so as to have a slight clearance to the extent that one sheet of the document S passes therethrough.

Upon passing through of the document S between the second reading unit 25 and the second platen roller 23 at the predetermined reading speed, the reading out of image information of a second side (upper surface in the drawing) is started.

The document S after finishing the reading passes between a plurality of transfer ribs 60 disposed downstream the second reading unit 25 of the transfer guide unit 16 and the transfer surface 56 of the lower frame 21 and is conveyed outside the apparatus toward the discharge tray 400 by the discharge roller pair 24. Upon finishing conveying the first sheet, the document is sequentially conveyed from the documents S placed on the document tray 300, and after the last document s is discharged, the apparatus is stopped to operate.

The feeding and the conveying are driven by a motor (not shown).

In such a manner, by the first reading unit 1 of the scanner section 100 and the second reading unit 25 mounted on the document reading/conveying section 200, both sides of the double-sided document S can be read during one-time transfer.

Figure 2:
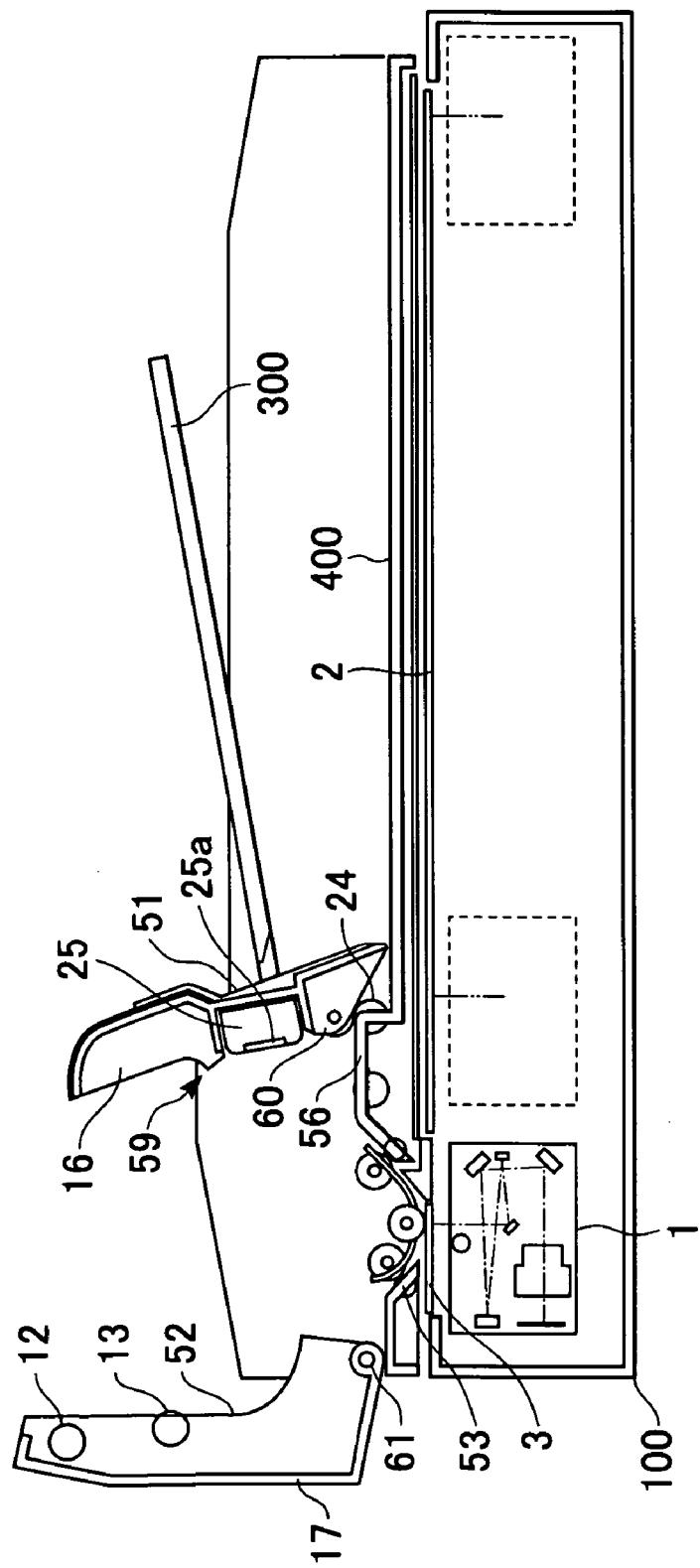
FIG. 2 is a drawing showing an opened state of a transfer path of the double-sided document ADF according to the embodiment of the present invention.

Next, the opening of the apparatus for jamming treatment or maintenance will be described with reference to FIG. 2.

The external cover 17 is constructed rotatably about a cover fulcrum 61 counterclockwise in the drawing.

At this time, the feeding roller 12 and the separation transfer roller 13 are also rotated together with the external cover 17.

By rotating the external cover 17, the external guide 52 formed on the external cover 17 is separated from the internal guide 99 of the case 58. By this operation, a curved document transfer path C defined by the external guide 52 and the internal guide 99 of the case 58 is opened. Also, a feeding transfer path F defined by the external guide 52 of the external cover 17 and the feeding guide 98 formed on the upper surface of the case 58 is simultaneously opened. Accordingly, jamming can be easily treated.

Then, the jamming treatment or maintenance for a portion below the transfer guide unit 16 will be described. The transfer guide unit 16 is rotatable about the shaft of the discharge roller 24 so that the internal guide 99 formed on the case 58 moves upward.

The recesses 71 formed at both ends of the case 58 of the transfer guide unit 16 is normally in a state abutting the transfer surface 56; during the jamming treatment and maintenance, this transfer guide unit 16 itself is rotated clockwise in the drawing.

By this operation, a reading transfer path R defined by the reading transfer ribs 59 formed under the transfer guide unit 16 and the transfer surface 56 of the lower frame is opened so that the jamming treatment and maintenance are easily conducted. In addition, the substantially U-shaped document transfer path according to the present invention is defined by the curved document transfer path C and the reading transfer path R.

According to the embodiment, the reading unit is arranged integrally with the transfer guide unit, and the guide surfaces are formed on both sides that are the reading surface of the transfer guide unit (adjacent to the reading transfer path R) and the opposite side (adjacent to the feeding transfer path F) disposed substantially in parallel therewith, while the transfer guide unit is movable, so that the opening operation required for the jamming treatment and maintenance can be achieved with a simple mechanism.

Since the case of the transfer guide unit is made of a resin and the transfer rib is integrally formed, a very inexpensive opening operation mechanism is achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus comprising:
   a substantially U-shaped document transfer path through which a document is transferred, wherein the document transfer path is constituted by an internal guide and an external guide;
   a reading unit configured to read an image on the document transferred through the document transfer path;
   a reading transfer path, in which the reading unit is arranged, and which is a part of the document transfer path;
   a feeding unit configured to feed the document;
   a cover having the external guide; and
   a separating roller and separating pad abutting the separating roller for separating the document fed by the feeding unit one at a time,
   wherein the external guide is rotatably disposed, and a part of the document transfer path is opened by rotating the external guide in a first rotational direction,
   wherein the internal guide is rotatably disposed and supports the reading unit, and the reading transfer path is opened by rotating the internal guide in a second rotational direction opposite to the first rotational direction, the internal guide comprising a reading guide constituting the reading transfer path, and a feeding guide constituting a feeding path, in which the feeding unit is arranged, wherein the feeding path is a part of the document transfer path, and wherein a document feeding direction of a document fed through the feeding path is opposite to a document feeding direction of a document fed through the reading transfer path, wherein the cover is rotatable about an apparatus body in a direction opposite to the second rotational direction of the internal guide, and the external guide is separated from the internal guide by rotating the cover so that a part of the document transfer path is opened, and wherein the feeding unit and the separating roller are disposed on the cover, and the separating pad is disposed on the internal guide.

2. An apparatus according to claim 1, wherein the reading unit comprises a contact-type sensor.

3. An apparatus according to claim 1,
wherein the internal guide is made of a resin and has a plurality of ribs.

4. An apparatus according to claim 1, wherein after the external guide is rotated, the reading transfer path of the document transfer path is opened by rotating the internal guide.

5. An apparatus according to claim 1, wherein the rotation center of the internal guide is provided upstream the reading unit in a feeding direction of a document.

* * * * *